United States Patent

[11] 3,624,303

[72] Inventor Francis H. Hilbert
River Grove, Ill.
[21] Appl. No. 17,597
[22] Filed Mar. 9, 1970
[45] Patented Nov. 30, 1971
[73] Assignee Motorola, Inc.
Franklin Park, Ill.

[54] SIGNAL-DEMODULATING PHASE CONTROL SYSTEM
7 Claims, 3 Drawing Figs.

[52] U.S. Cl. .......... 179/15 BS
[51] Int. Cl. .......... H04j 3/06
[50] Field of Search .......... 178/5.4, 6.7 A, 5.4 CR; 329/10 G; 179/15 AW, 15 AP, 15 BT, 15 MM, 15 A, 15 BS

[56] References Cited

UNITED STATES PATENTS

| | | | |
|---|---|---|---|
| 3,162,838 | 12/1964 | Sauvanet .......... | 179/15 A |
| 3,248,718 | 4/1966 | Uemura .......... | 179/15 A |
| 3,459,855 | 8/1969 | Goldmark et al. .......... | 178/5.2 |
| 3,489,853 | 1/1970 | Lang .......... | 325/40 |

*Primary Examiner*—Kathleen H. Claffy
*Assistant Examiner*—David L. Stewart
*Attorney*—Mueller & Aichele

ABSTRACT: Pulse-width modulated, time-division multiplexed pulses are used to convey two channels of color information in an electronic video-recording (EVR) system, with the color information being recovered by a demodulator gate switched in synchronism with the information signal train to alternately pass the information pulses to different outputs of the gate. At predetermined intervals, the modulation of the pulse widths of the two channels is in the form of maximum width modulation in one channel alternating with no information in the other channel; the pattern being repeated a predetermined number of times. A detecting circuit coupled to an output of the demodulator gate responds to the presence of this sequence in improper phase and corrects the phase of operation of the demodulator gate if the sequence is being demodulated in the wrong phase.

Inventor
FRANCIS H. HILBERT
BY
Mueller, Aichele & Rauner
ATTYS.

SIGNAL-DEMODULATING PHASE CONTROL SYSTEM

BACKGROUND OF THE INVENTION

An electronic video-recording (EVR) system for color information has been proposed using a combination of pulse-width modulation and time-division multiplex for conveying the color saturation and hue information. This system uses an on-off light transfer characteristic together with signal clipping on the chroma channel in the EVR player to produce the necessary pulse-width modulated signals from a film which has the color information recorded as only two levels, opaque and clear. Within each time-division multiplex interval, the color saturation information for the hue represented by that interval or channel is encoded in the form of a width-modulated pulse, with alternating time-division multiplex intervals corresponding to the two different hues necessary for conveying the color information.

It is important that the demodulator is operated in proper phase with the encoded information. If this is not done, information corresponding to one hue is channeled to the utilization circuit for the opposite hue and vice versa, resulting in unacceptable operation.

SUMMARY OF THE INVENTION

Accordingly, it is an object of this invention to correct the phase of operation of a demodulator switch used to separate pulse-width modulated, time-division multiplexed signals.

It is an additional object of this invention to encode pulsing information in a pulse-width modulated, time-division multiplexed system in the form of a predetermined pattern of pulses and to detect the phase of this pattern of pulses in the output of the demodulator switch to control the phase of operation of the demodulator switch.

It is a further object of this invention to control the state of operation of a demodulator gate operated in synchronism with a pulse-width modulated, time-division multiplexed signal by changing the state of operation of the demodulator gate in response to the detection of a predetermined energy level from one of the outputs thereof during a phasing synchronizing portion of the signal.

In accordance with a preferred embodiment of this invention, a pulse-width modulated, time division multiplexed signal representative of information on different channels is directed to different utilization circuits under the control of switching clock pulses produced in synchronism with each modulated pulse interval. In order to insure that the phase of operation of the system directing the signal to the different utilization circuits is in phase with signal as it is encoded for the different channels, a predetermined pattern of phasing information modulation is transmitted at the beginning of a sequence to be decoded. A trigger circuit is coupled to the output of a signal channeling or demodulating circuit to detect the energy content of this output during transmission of the phasing information and produces an output signal in response to an energy content in excess of a predetermined magnitude to change the state of operation of the channeling circuit.

DETAILED DESCRIPTION

Figures 1, 2:
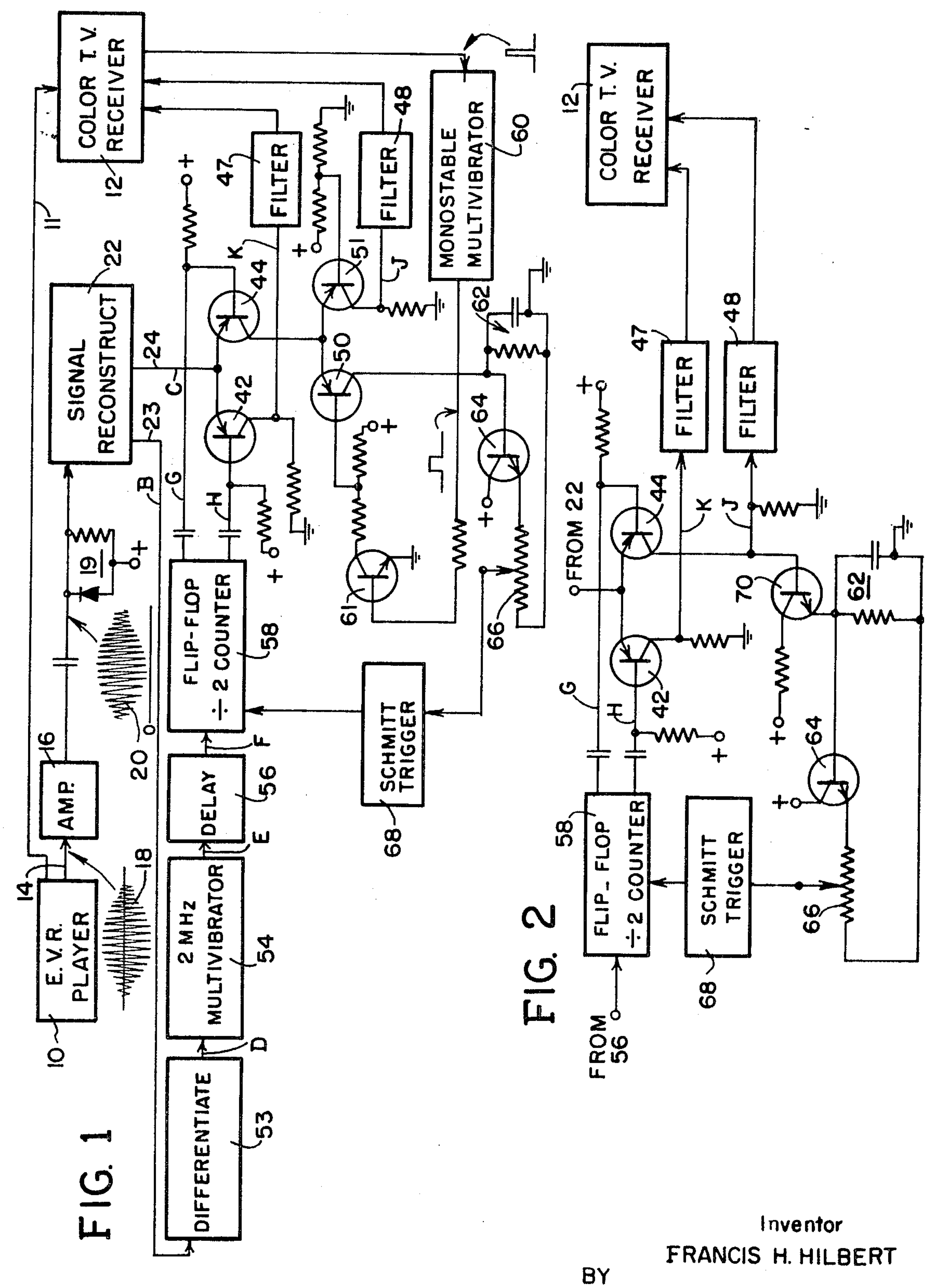
FIG. 1 is a schematic diagram, partially in block form, of a preferred embodiment of this invention.
FIG. 2 is a partial schematic diagram of another embodiment of this invention.

Referring now to FIG. 1, there is shown an EVR player for reproducing color EVR signals in which the brightness information supplied over one channel, represented by the lead 11, to a color television receiver 12; and the color information is supplied over another channel, represented by the lead 14, to an amplifier 16. This color information is obtained from color signals recorded on the EVR film in the form of vertical, opaque stripes which are varied in width to provide the appropriate color information. When the frame is scanned in synchronism with the brightness or monochrome signal in a separate corresponding frame, the color signal, in the form of width modulated rectangular pulses derived from the scanning pattern, is applied over the lead 14 to the amplifier 16. Since two color signals are required for a color television system, a time division multiplex of the two-color information is provided by recording the saturation information for different hues on alternate stripes of the film.

In order to provide recovery of synchronizing information to operate the demodulating or decoding system for separating this color information and supplying it to the television receiver 12, a positive-going transition is provided at the leading edge of each of the pulse intervals in the system shown in FIG. 1. Then a pulse of a predetermined minimum width occurring within a time division pulse interval may be utilized to represent a maximum negative color saturation for that pulse interval, whereas a pulse of a predetermined maximum width may be utilized to represent a maximum positive saturation of that color or hue for a given time division multiplex pulse interval. Of course, the trailing edges of the pulse intervals could be used for providing synchronizing information with the modulation being carried by the leading edges.

Figure 3:
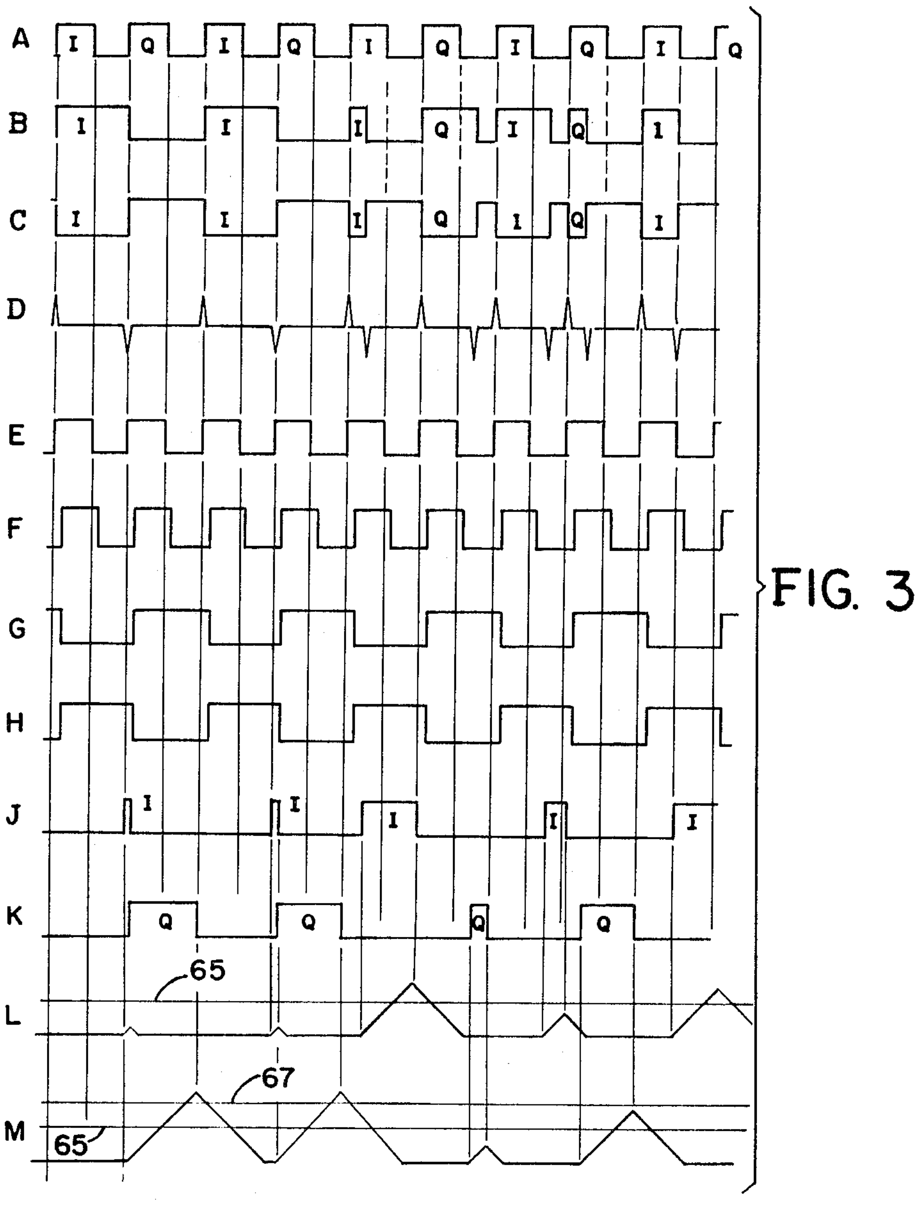
FIG. 3 illustrates waveforms useful in explaining the operation of the circuits shown in FIGS. 1 and 2.

A pulse signal train comprised of signals of two hues (chosen, for example, to be the I and Q color axes) is shown in waveform A of FIG. 3. The pulse train of waveform A is formed as an interleaved series of 1MHz pulse trains which are combined by time division multiplex to form the composite chroma signal shown in waveform A. A nominal pulse-width modulation representing zero saturation information midway between maximum negative saturation and maximum positive saturation is provided by a pulse-width which is one-fourth of each 1MHz time interval. In waveform A, the multiplexed pulse trains both carry this amount of modulation; so that the composite signal is a 2MHz square wave signal.

Since the signals obtained from the phototube of the EVR player 10 are distorted by aperture limitations of the cathode ray tube and lense system, the waveform applied to the input of the amplifier 16 is not of the ideal form shown in curve A but is distorted similarly to the waveform 18 shown in FIG. 1.

The signal actually supplied over the lead 14 of the EVR player 10 is not a uniform signal of the type shown in waveform A, but resembles the signal shown in waveform B when the line synchronizing and color saturation modulation of the interleaved I and Q pulses exists. At the beginning of each line scanned by the flying spot scanner the EVR player 10, the color information frame is modulated or encoded to provide phase synchronizing pulses for establishing the proper phase of operation of the decoding circuitry at the receiver. This phase information is obtained by fully modulating the I information pulses to their maximum width while at the same time providing a minimum modulation of the Q information pulses, preferably by preventing any Q information for appearing, (or vice versa). That is indicated in waveform B by the first two I information pulses which are separated by a time division slot containing no information (zero Q modulation).

Following the transmission of a small number of these phasing synchronization pulses, the pulse-width modulated time-division multiplexed color information data is supplied. As stated previously, the modulated color information does not appear as the regular symmetrical square wave-wave shown in waveform A of FIG. 3 but includes color information pulses ranging from a minimum information width modulation to a maximum information width modulation. Pulses carrying minimum information width modulation are shown in waveform B as narrow pulses with left-pointing arrows above them, and pulses carrying maximum information width modulation also indicated in waveform B by the pulses with the arrows pointing to the right located above them. Of course, in an actual signal, the pulse-widths would range between these tow extremes. Each information pulse is separated by a no-pulse interval, and the leading edge of each information pulse and the phase synchronization pulses all are precisely located to provide necessary synchronizing information. The modulation is on the trailing edge of the pulse supplied by the EVR player 10 over the lead 14.

The amplified signal 18 supplied from the output of the amplifier 16 is applied to a DC restoring circuit 19 which modifies the signal to appear as the signal 20. This restoration of the DC level is necessary in order to present the signal in proper form for regeneration by a signal reconstruction circuit 22, which may be in the form of a dual cascaded differential amplifier, with the circuit 22 operating to regenerate the original pulse train as shown in waveform B as closely as possible.

The circuit 22 has a pair of complimentary outputs, with the regenerated version of the original pulse train as shown in the waveform B appearing in the form of a sequence of current pulses on the output 23 and with its compliment or mirror image appearing on the output 24. This mirror image or complimentary output is illustrated in waveform C of FIG. 3. This inverted waveform C is applied to the common connected emitters of a pair of PNP-transistors 42 and 43 operated as in a differential amplifier configuration as a synchronous demodulator switch or steering gate.

The steering gate 42, 44 is switched or operated in synchronism with the input signal to alternately gate the information carried by the current pulses within each time division interval of the waveform C to a pair of low-pass filters 47 and 48, with the signals appearing on the collector of the transistor 42 corresponding to the demodulated Q color information signals and the signals appearing on the collector of transistor 44 corresponding to the demodulated I color information signals. The signals on the collector of the transistor 44 are passed through a normally conductive PNP-transistor 51 of an additional differential amplifier switch including a second PNP-transistor 50; so that during the information carrying portions of the signal waveforms B and C, the demodulated color information is applied directly to the low-pass filters 48 and 49 to provide the demodulated I and Q color output signals. These output signals then are applied to the color TV receiver 12 and may be used directly to drive the cathode-ray tube in that receiver if it is capable of operation on I and Q signals; or if necessary, these I and Q signals may be recombined with a 3.58 MHz reference signal at the proper phase for providing a composite chroma signal to be utilized in a television receiver for demodulating R, B, and G color information.

The reconstructed signal obtained from the collectors of either of the transistors 38 and 39 includes the necessary synchronization information for synchronizing the clock circuitry necessary to operate the demodulator switch 42, 44, since the negative to positive pulse transitions or leading edges of the pulses defining each of the pulse intervals in the waveform B (or the positive to negative pulse transitions of the waveform C) each occur at a predetermined fixed position relative to all other similar pulse transitions. To utilize this information to synchronize the operation of the demodulator switch, the waveform B obtained from the collector of the transistor 38 is applied through a differentiating circuit 53 which produces the waveform D shown in FIG. 3 at its output. The positive pulses of the waveform D applied to the input of a 2MHz free-running multivibrator 54 synchronize the phase of operation of the multivibrator 54 with the reconstructed composite signal. Waveform E of the FIG. 3 illustrates the output pulses of the multivibrator 54, and it may be noted that these pulses occur at the 2MHz frequency illustrated in waveform A for a nominal or midpoint width modulation of both the I and Q channels in synchronism with the signals shown in waveforms A, B and C.

The 2MHz clock signal obtained from the output of the multivibrator 54 is supplied through a delay circuit 56 to produce the delayed clock pulse shown in waveform F of FIG. 3. The delay introduced in the clock pulses by the delay circuit 56 is approximately 1/10 of the time between the synchronizing pulse transitions of the I and Q modulated waveform as represented by the positive peaks of the waveform D in FIG. 3.

These delayed clock pulses then are applied to a divide-by-two counter in the form of a complimentary flip-flop or bistable multivibrator 58, which provides a pair of complimentary square wave outputs, G and H (FIG. 3) applied to the bases of the demodulator switching transistors 44 and 42, respectively. The switching signals G and H occur at a 1MHz frequency and render the PNP-transistor to which they are applied conductive whenever they are low and nonconductive when they are high. Since these signals are the compliment of one another, one of the other of the transistors 44, 42 is always conducting to gate the input signals applied from the collector of the transistor 39 to the appropriate low-pass output filter 47 or 48.

Since the switching of the transistors 42 and 44 occurs at a frequency which is substantially one-half of the frequency of the modulated input signal, as most clearly seen in waveform A of FIG. 3, only the Q information present in the waveform C is applied to the low-pass filter 47, and only the I information present in the waveform C is applied to the low-pass filter 48. The information gated by the demodulator switch 42 and 44 operating on an input composite waveform, such as the waveform C of FIG. 3, is shown by the waveform J applied to the input of the filter 48 and the waveform K applied to the input of the filter 47.

It should be noted that in the pulse intervals where the input signal train shown in waveform B contains a signal with maximum width modulation, a minimum width output pulse is applied to the corresponding filter 47 or 48; and when the input signal of waveform B contains a pulse interval with minimum width modulation, a maximum width output pulse is applied to the input of the corresponding filter 47 or 48. By utilizing the inverted input signal (waveform C) as the reconstructed input to the demodulator switch, this inversion takes place; but since the color saturation information is contained by the ratio of no-current to current portions in each time division pulse interval, the inversion permits recovery of the same relative color values, but with a minimum width current pulse signal corresponding to a maximum positive saturation of the particular hue and vice versa. It should be noted that the color saturation information also could be conveyed by transitions form one current level to a different current level or the like.

The reason for delaying the phase of the clock or switching pulses provided from the complimentary flip-flop 58 and for applying the inverted reconstructed signal train of current and no-current pulses as the input signal to the demodulator switch 42 and 44 is to cause the switching of the state of conduction of the transistors 42 and 44 to always occur when a no-current condition exists in the input signal applied to the emitters of the transistors 42 and 44. This is clearly illustrated by reference to waveforms C, G and H in FIG. 3, when it is noted that the transistors 42 and 44 are rendered conductive upon the positive-to-negative going transitions of the corresponding waveforms H and G applied to the bases of these transistors.

It should be apparent that if the phase of switching of the demodulator switch transistors 42 and 44 is not in accordance with the phase of the received I and Q time division multiplexed information, the outputs of the demodulator switch 42 and 44 would be reversed. The I color information then would be applied to the low-pass filter 47 for the Q channel and the Q color information would be applied to the low-pass filter 48 for the I channel. This situation obviously could not be tolerated.

In order to insure that the operation of the demodulator switch 42 and 44 is in proper phase relationship with the signal obtained from the EVR player 10 and reconstructed by the circuit 22, the signal obtained from the player 10 at the beginning of each line of information includes the synchronizing pulses discussed previously in conjunction with waveform B. As described previously, these synchronizing pulses include fully modulated I portions alternating with no information during the time division intervals corresponding to the Q channel, with this sequence being repeated for four or five times. Thus, at the beginning of each line of received color information, it is possible to detect a proper phase relationship of the demodulator operation to the signal. To do this, the information present on the collector of the transistor 44 (the I channel information) is monitored during the time when these phase synchronizing pulses are present.

The horizontal flyback pulse from the color television receiver 12 is applied to a monostable multivibrator 60 which produces a 5 microsecond synchronizing gate pulse commencing with the trailing edge of the flyback pulse. This synchronizing gate pulse is applied to the base of an NPN-transistor 61 to render the transistor 61 conductive during the presence of the synchronizing gate pulse. When the transistor 61 conducts, the potential on the base of the transistor 50 drops to a level which is below the potential applied to the base of the transistor 51; causing the transistor 50 to conduct and the transistor 51 to be cut off. This causes the output of the transistor 44 to be diverted through the transistor 50 a short time constant integrator circuit 62 connected to the base of an NPN-emitter follower transistor 64.

The voltage on the emitter of the transistor 64 corresponds to the voltage buildup and decay in the short time constant integrating circuit 62, which in turn is determined by the energy content of the pulses passed through the transistor 50 from the collector of the transistor 44 during the synchronizing gate pulse interval. This voltage is applied across the potentiometer 66 to establish an adjustable threshold for a Schmitt trigger circuit 68. If the system is in proper phase synchronization, the initial portion of the waveform J shown in FIG. 3, with the low energy content I pulses, is applied to the circuit 62 resulting in the waveform L appearing on the emitter of the transistor 64.

In conjunction with waveform L, there is a horizontal line 65 shown which is the threshold or trigger level set for the Schmitt trigger circuit 68. It can be seen that the low information content I pulses appearing during the phasing interval of the waveform L fall below this threshold level. As a consequence, the voltage obtained from the tap of the potentiometer 66 when the system is in proper phase is below the threshold or triggering level of the Schmitt trigger circuit 68 and has no affect on the operation of the circuit.

Upon termination of the synchronizing gate pulse applied to the base of the transistor 61, that transistor once again is rendered nonconductive, which in turn causes the transistor 50 to be rendered nonconductive and the transistor 51 to be rendered conductive. The signals present on the collector of the transistor 44 then are passed through the transistor 51 to the low-pass filter 48.

If the operation of the differential amplifier demodulator switch 42, 44 is out of phase (the switch is either in phase or 180° out of phase with the information signal train), the signal passed by the transistor 50 to the integrating circuit 62 during the presence of the synchronizing gate pulse is the signal waveform K instead of the waveform J. It can be seen that during the synchronizing interval, the waveform K contains a high energy content of information compared to the waveform J; so that a signal of the type shown in waveform M is present on the emitter of the transistor 64. It also is apparent that the sawtooth ramp portions of the waveform M reach a substantially higher potential than when the system is in phase synchronization As indicated by the Schmitt trigger threshold level 65 superimposed on waveform M, this higher potential is sufficient to exceed the trigger level of the Schmitt trigger circuit 68, which thereupon produces an output pulse applied to the flip-flop 58 as an additional trigger pulse to change its state, placing the system back in phase. The operation of the circuit then continues in the manner previously described. If for some reason the first out-of-phase synchronizing pulse of waveform K does not produce this threshold trigger pulse, the next one will. This is the reason for repeating the phasing sequence a number of times at the beginning of each line interval.

To be recognized as an additional trigger pulse at the flip-flop 58, it is important that the output pulse of the Schmitt trigger circuit not coincide with the synchronizing or driving pulses obtained from the delay circuit 56. This may be insured by setting the threshold level of the Schmitt trigger circuit 68 to occur at or just past the midpoint of the voltage ramp produced in the circuit 62 by an out-of-phase high energy content pulse (as shown in waveform M) during the synchronizing interval. A comparison of the relative times of occurrences of the synchronizing pulses with the intersection of this ramp of the waveform M with the threshold triggering level 65 shows that such coincidence of the additional trigger with the timing pulses applied to the flip-flop 58 is prevented.

From the examination of waveform K of FIG. 3, it can be seen that the energy content of the Q pulses during the phasing intervals is greater than the maximum energy content of the Q pulses for maximum pulse-width modulation during transmission of the color information; so that it is possible to operate the phase correction circuit without the requirement of the gate 50, 51, 61 opened in response to the horizontal flyback pulse from the color television receiver 12. This can be done by moving up the threshold level of the Schmitt trigger circuit 68 to a point where it is above the maximum energy which can be reached by the integrating circuit 62 during a maximum width modulated color information pulse interval, but which is still below the maximum potential which can be obtained by the circuit 62 during the phasing information portion of the signal (waveform k) at the beginning of each line.

Reference to FIG. M shows a second higher threshold line 67 which is intersected by the ramp occuring during the first two pulse intervals of the waveform K, but which is above the final interval of waveform K which is produced by a maximum width modulated signal during the information transmission portion of the waveform B and C. By utilizing this higher threshold level, the collector of the demodulator switch transistor 44 may be coupled directly to the filter 48 in the same manner that the collector of the transistor 42 is coupled to the filter 47 for application of signals to the television receiver 12. In addition the collector of the transistor 44 is used to drive an emitter follower transistor 70, the emitter of which then provides the waveform present on the collector of the transistor 44 to the integrating circuit 62. The emitter follower circuit 70 is used to provide isolation between the circuit 62 and the input to the filter 48. In all other respects the operation of the circuit shown in FIG. 2 is the same as that shown in FIG. 1; and for that reason, the remaining details of the circuit of FIG. 1 have not been shown in FIG. 2.

In the circuit of FIG. 2 the phase synchronizing circuit continuously monitors the output of the transistor 44; but since the threshold level used to monitor the waveform applied to the Schmitt trigger circuit 68 is set above the maximum potential which can be obtained by the circuit 62 during a maximum width modulated pulse during the information transmission portions of the signal, the circuit of FIG. 2 has no affect on the operation of the divide-by-two counter 58 during the reception and demodulation of the color information portion of the signal transmission. During the presence of the phasing information, however, if an out of phase condition exists, the high energy content of the waveform K causes the Schmitt trigger 68 to operate in the manner previously described to produce a phasing pulse to the counter 58.

The circuit of FIG. 1 provides additional insurance that no erroneous operation of the Schmitt trigger circuit 68 can take place during demodulation of normal color information from the EVR player 10, since in the circuit of FIG. 1 the only time that the phase correction circuitry is enabled for operation is upon termination of a flyback pulse applied to the monostable multivibrator 60. With a sufficient distinction between the energy content of the waveform K during the phasing portion of the applied signal and the maximum pulse width modulation during the information bearing portion of the signal, however, it is possible to use the configuration shown in FIG. 2, resulting in a substantially simplified circuit for accomplishing the same results.

I claim:

1. A system for demodulating signals in the form of a sequence of pulse-width modulated and time-division multiplexed pulses, with alternating pulses in the pulse sequence representing two different channels of information, the pulse-width modulation corresponding to the information content and the pulse sequence commencing with a phase-synchronizing signal portion in the form of pulses of a predetermined width modulation within each time division interval corresponding to one of said channels of information, alternating with predetermined lesser with modulation in each time division interval corresponding to the other of said channels of information, the system including in combination:

first and second utilization circuits;

channeling means having first and second states of operation for channeling the pulses in the sequence to the first and second utilization circuits, respectively, in accordance with the first and second states of operation;

means responsive to and operated in synchronism with said pulse sequence for controlling the operation of the channeling means to alternately change the state of operation thereof to channel the pulses to the first and second utilization circuits;

means coupled with an output of the channeling means and responsive to a predetermined width of channeled pulses during at least the phase synchronizing signal portion of the pulse sequence for producing a control signal indicative of an improper state of operation of the channeling means relative to the sequence; and means for coupling said control signal to the means for controlling the operation of the channeling means to cause said controlling means to change the state of operation of the channeling means.

2. A system for demodulating signals in the form of a sequence of pulse-width modulated and time-division multiplexed pulses, with alternating pulses in the pulse sequence representing two different channels of information, the pulse-width modulation corresponding to the information content, the pulse sequence to be demodulated commencing with a phase-synchronizing signal portion in the form of a predetermined ratio of width modulation in the two channels in the pulse sequence, the widths of the pulses in one of the two channels during the phase synchronizing signal portion being greater than the maximum widths of the pulse width modulation corresponding to information occuring during the remainder of transmission, the system including in combination:

first and second utilization circuits;

channeling means having first and second states of operation for channeling the pulses in the sequence to the first and second utilization circuits, respectively, in accordance with said first and second states of operation;

means responsive to and operated in synchronism with a signal sequence for controlling the operation of the channeling means to alternately change the state of operation thereof to channel the pulses to the first and second utilization circuits;

means coupled with the output of the channeling means and responsive to a predetermined energy content of the pulses determined by the widths thereof for producing a control signal with the channeling means being operated at an improper state relative to the phase of the pulses in the pulse sequence; and the means for controlling the operation of the channeling means being further responsive to said control signal for changing the state of operation of the channeling means.

3. The combination according to claim 2 wherein the means for producing said control signal includes a short time constant integrating circuit producing an output voltage having a magnitude indicative of the widths of the pulses obtained from the output of the channeling means and further includes a threshold trigger circuit responsive to a predetermined magnitude of said output voltage for producing said control signal.

4. The combination according to claim 3 wherein the output voltage produced by the integrating circuit in response to an improperly channeled phase-synchronizing signal pulse is greater than the maximum output voltage produced by the integrating circuit in response to pulses in the pulse sequence representing modulated information, with the threshold of the trigger circuit being set above the maximum voltage produced by the integrating circuit during information demodulation and being set below the maximum voltage produced by the integrating circuit for an improperly channeled pulse occurring during the synchronizing signal portion of the signal.

5. A system for demodulating signals in the form of a sequence of pulse-width modulated and time-division multiplexed pulses, with alternating pulses in the pulse sequence representing two different channels of information, the pulse width modulation corresponding to the information content, the pulse sequence commencing with a phase-synchronizing signal portion in the form of pulses of a predetermined width, greater than the maximum information width modulation, within each time-division interval corresponding to one of said channels of information, alternating with intervals of no pulses in each time-division interval corresponding to the other of said channels of information, the system including in combination:

first and second utilization circuits;

a steering gate having an input and first and second outputs for channeling signals applied to the inputs to one or the other of the first and second outputs;

means coupling the first and second outputs of the steering gate with the first and second utilization circuits;

means for applying the sequence of multiplexed pulses to the input of the steering gate;

means responsive to the sequence of pulses for controlling the switching of the steering gate from one output to the other in synchronism with the pulse sequence to alternately channel the pulses to the first and second utilization circuits;

gating means coupled to one of the outputs of the steering gate;

control signal producing means;

means operative during the phase synchronizing signal portion for enabling the gating means to supply signals from the output to which the gating means is connected to the control signal producing means, with the control signal producing means producing an output signal when the steering gate is being operated at an improper phase relative to the pulse sequence as indicated by the width of the pulses passed by the gating means; and means for applying the output signal of the control signal producing means to the means for controlling the switching of the steering gate to cause the output of the steering gate to be switched.

6. The combination according to claim 5 wherein the means for controlling the switching of the steering gate is a bistable multivibrator and wherein the output signal of the control signal producing means is applied to the input of the bistable multivibrator to change the state of operation thereof in response thereto.

7. The combination according to claim 6 wherein the output of the gating means coupled to the steering gate is supplied to an integrating circuit and wherein the control signal producing means is a threshold trigger circuit, with means for coupling the integrating circuit to the input of the trigger circuit, the integrating circuit producing a potential corresponding to the energy content of the signal at the output of the steering gate and the trigger circuit producing said output signal when the potential produced by the integrating circuit exceeds the threshold of the trigger circuit.

* * * * *